(12) United States Patent
Kurachi et al.

(10) Patent No.: US 6,761,375 B2
(45) Date of Patent: Jul. 13, 2004

(54) STRUCTURE OF REINFORCEMENT PLATE MEMBER USED IN AUTOMOBILE AIRBAG APPARATUS

(75) Inventors: Yukio Kurachi, Fukumitsu-machi (JP); Mitsuo Yasuda, Fukumitsu-machi (JP)

(73) Assignee: Sanko Gosei Kabushiki Kaisha, Toyama-Ken (JP)

( * ) Notice: Subject to any disclaimer, the term of this patent is extended or adjusted under 35 U.S.C. 154(b) by 0 days.

(21) Appl. No.: 09/843,083

(22) Filed: Apr. 25, 2001

(65) Prior Publication Data

US 2001/0035635 A1 Nov. 1, 2001

(30) Foreign Application Priority Data

Apr. 26, 2000 (JP) ....................................... 2000-125999

(51) Int. Cl.⁷ ............................................. B60R 21/16
(52) U.S. Cl. ................ 280/732; 280/728.2; 280/728.3; 280/731
(58) Field of Search .......................... 280/728.3, 728.2, 280/731, 732

(56) References Cited

U.S. PATENT DOCUMENTS

| | | | |
|---|---|---|---|
| 4,148,503 A | 4/1979 | Shiratori et al. ............ 280/731 |
| 5,183,288 A | 2/1993 | Inada et al. ................. 280/732 |
| 5,322,324 A | * 6/1994 | Hansen et al. .............. 280/731 |
| 5,411,288 A | 5/1995 | Steffens, Jr. ............. 280/728.3 |
| 5,549,324 A | * 8/1996 | Labrie et al. ............ 280/728.3 |
| 5,569,959 A | 10/1996 | Cooper et al. ............ 280/728.3 |
| 5,685,560 A | 11/1997 | Sugiyama et al. .......... 280/731 |
| 5,738,367 A | 4/1998 | Zichichi et al. .......... 280/728.3 |
| 5,769,451 A | 6/1998 | Inada et al. ................. 280/732 |
| 5,779,262 A | 7/1998 | Totani et al. ............ 280/728.3 |
| 5,806,879 A | 9/1998 | Hamada et al. .......... 280/728.2 |
| 5,816,609 A | * 10/1998 | Gray et al. .............. 280/728.3 |
| 5,839,752 A | 11/1998 | Yamasaki et al. ........ 280/728.3 |
| 5,863,064 A | 1/1999 | Rheinlander et al. ....... 280/732 |

(List continued on next page.)

FOREIGN PATENT DOCUMENTS

| | | |
|---|---|---|
| JP | 406144142 A | 5/1994 |
| JP | 7-172256 | 7/1995 |
| JP | 07-291078 | 11/1995 |
| JP | 10-044910 | 2/1998 |
| JP | 11-198752 | 7/1999 |
| JP | 2001-206180 | 7/2001 |

OTHER PUBLICATIONS

U.S. patent application Ser. No. 09/975,665, Yasuda et al., filed Oct. 10, 2001.
U.S. patent application Ser. No. 10/008,862, Taoka et al., filed Nov. 7, 2001.
U.S. patent application Ser. No. 10/392,132, Yasuda et al., filed Mar. 18, 2003.
U.S. patent application Ser. No. 10/449,135, Yasuda et al., filed May 28, 2003.

Primary Examiner—Brian L. Johnson
Assistant Examiner—Deanna Draper
(74) Attorney, Agent, or Firm—Ladas & Parry (57) ABSTRACT

An automobile airbag apparatus disposed within an instrument panel covered with an interior cover. A fracture-opening section is defined in the interior cover to be located in opposition to the opening portion of the airbag case. The fracture-opening section is defined by at least a fragile groove formed from the back surface of the interior cover to surround the fracture-opening section. A reinforcement plate member is attached to the back surface of the fracture-opening section through deformation of a portion of the fracture-opening section through application of heat thereto. The reinforcement plate member has a main-body portion attached to the back surface of the fracture-opening section and an attachment portion extending from the main-body portion via a hinge portion. A plurality of slits are formed at predetermined intervals in the longitudinal direction of the reinforcement plate member such that the slits extend in parallel in the transverse direction of the reinforcement plate member.

17 Claims, 5 Drawing Sheets

U.S. PATENT DOCUMENTS

| | | | |
|---|---|---|---|
| 5,865,461 A | | 2/1999 | Totani et al. ............. 280/728.3 |
| 5,868,419 A | | 2/1999 | Taguchi et al. ........... 280/728.3 |
| 5,961,142 A | * | 10/1999 | Shiraki et al. ............ 280/728.3 |
| 6,012,735 A | * | 1/2000 | Gray et al. ............... 280/728.2 |
| 6,070,901 A | | 6/2000 | Hazell et al. ............. 280/728.3 |
| 6,076,851 A | | 6/2000 | Davis, Jr. et al. ........ 280/728.2 |
| 6,079,734 A | * | 6/2000 | Porter ...................... 200/61.54 |
| 6,089,642 A | | 7/2000 | Davis, Jr. et al. ............. 296/70 |
| 6,109,645 A | | 8/2000 | Totani et al. ............. 280/728.3 |
| 6,161,865 A | * | 12/2000 | Rose et al. ............... 280/728.2 |
| 6,203,056 B1 | * | 3/2001 | Labrie et al. ............. 280/728.3 |
| 6,250,669 B1 | | 6/2001 | Ohmiya ....................... 280/732 |
| 6,299,198 B1 | * | 10/2001 | Nakashima et al. ...... 280/728.2 |
| 6,340,170 B1 | * | 1/2002 | Davis et al. .............. 280/728.3 |
| 6,394,485 B1 | * | 5/2002 | Amamori ................. 280/728.2 |
| 6,406,056 B2 | | 6/2002 | Yokota ..................... 280/728.2 |
| 6,435,542 B2 | | 8/2002 | Nakashima et al. ...... 280/728.3 |
| 6,494,481 B2 | * | 12/2002 | Yasuda ........................ 280/703 |
| 2002/0005630 A1 | | 1/2002 | Suzuki et al. ............. 280/728.3 |

* cited by examiner

STRUCTURE OF REINFORCEMENT PLATE MEMBER USED IN AUTOMOBILE AIRBAG APPARATUS

CROSS REFERENCE TO RELATED APPLICATIONS

The subject matter of the present application may also be related to the following U.S. patent applications: "Airbag Device for Use in a Vehicle," Ser. No. 09/975,665, filed Oct. 10, 2001; "Airbag Apparatus for Automobile" Ser. No. 10/008,862, filed—Nov. 7, 2001 (now U.S. Pat. No. 6,692, 017); "Airbag Apparatus for Automobile," Ser. No. 10/392, 132, filed—Mar. 18, 2003; "Airbag Apparatus for Automobile," Ser. No. 10/449,135 filed May 28, 2003; "Airbag Apparatus for Front Passenger Seat," Ser. No. 09/847,550, filed May 2, 2001 (now U.S. Pat. No. 6,435, 542), and "Airbag Apparatus for Front Passenger Seat," Ser. No. 09/836,664, filed Apr. 17, 2001 (now U.S. Pat. No. 6,494,481).

BACKGROUND OF THE INVENTION

1. Field of the Invention

The present invention relates to the structure of a reinforcement plate member used in an automobile airbag apparatus for protecting a driver or passenger upon collision of a vehicle, such as a car, to thereby ensure safety. More particularly, the invention relates to an improvement in the structure of a reinforcement plate member for a fracture-opening section which breaks so as to allow unfolding and expansion of an airbag, which structure enables reliable melt-joining between the reinforcement plate member and the fracture-opening section.

2. Description of the Related Art

An airbag apparatus used in a vehicle, such as a car, basically includes an airbag, an airbag case for accommodating the folded airbag, and an inflater for inflating the airbag. The airbag apparatus is accommodated within an instrument panel on the front-passenger-seat side, or within a steering wheel or side pillar, such that the airbag apparatus faces a driver or passenger. The cover of the instrument panel includes a fracture-opening section for allowing unfolding and expansion of the airbag. The fracture-opening section has a size corresponding to that of an opening portion of the airbag case and is defined by a perforation-like fracture groove surrounding the fracture-opening section.

A reinforcement plate member formed of metal is integrally fixed to the inner wall surface of the fracture-opening section; and a hinge portion of the reinforcement plate member is connected to the instrument panel.

The thus-configured automobile airbag apparatus functions in the following manner. Upon collision of the vehicle, an impact force caused by the collision is detected by a sensor. A control unit including a CPU judges whether or not the detected impact force is equal to or higher than a predetermined value. When the control unit judges that the impact force is not lower than the predetermined value, the control unit issues a signal for causing the inflater to generate a predetermined gas. The gas is fed to the airbag so as to promptly inflate the airbag.

The inflating airbag presses, from inside, the fracture-opening portion of the instrument panel cover (hereinafter referred to as an "interior cover"), including the reinforcement plate member. The fracture-opening section is fractured along a fracture groove and detached from the interior cover. The detached fracture-opening section is opened outward while being turned inside out about the hinge portion of the reinforcement plate member. Simultaneously, the inflating airbag projects outward from the interior cover through the thus-formed opening in the interior cover. Serving as a cushion, the inflated airbag supports a passenger, such as a front seat passenger, at his/her chest and head, thereby protecting the passenger from the impact force of collision.

Generally, the instrument panel of an automobile consists of an instrument panel core formed from a synthetic resin, such as polypropylene, through integral molding, and an instrument panel cover (interior cover), which covers the instrument panel core and is formed of a synthetic resin, such as polypropylene.

A conventional reinforcement plate member attached to the back surface of the fracture-opening section will be described with reference to FIGS. 1 to 3.

Figure 1:
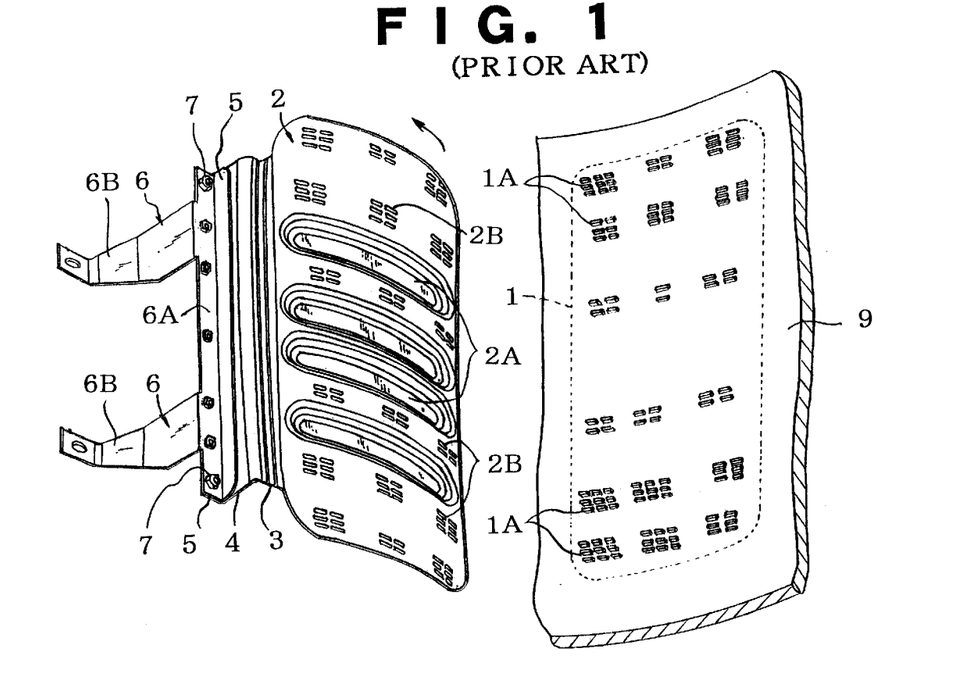
FIG. 1 is a perspective view of a conventional automobile airbag apparatus showing a fracture-opening section formed in an interior cover and a reinforcement plate member for reinforcing the fracture-opening section from the inner surface thereof.
Figure 2:
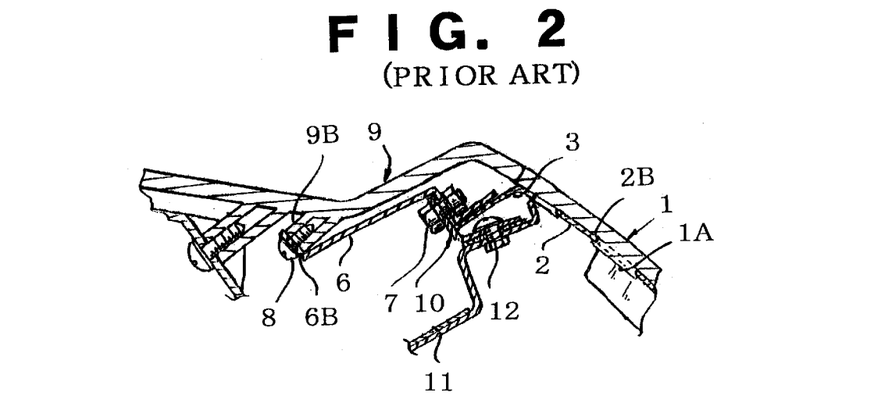
FIG. 2 is an explanatory sectional view of a main portion of the conventional airbag before inflation of an airbag.

FIG. 1 is a perspective view of a fracture-opening section formed in an interior cover and a reinforcement plate member for reinforcing the fracture-opening section from the inner surface thereof. FIG. 2 is an explanatory sectional view of a main portion before inflation of an airbag. FIG. 3 is an explanatory sectional view of the main portion after inflation of the airbag.

As shown in FIG. 1, a reinforcement plate member 2 for reinforcing a fracture-opening section 1 has a curved shape corresponding to that of the inner wall surface of the fracture-opening section 1. The reinforcement plate member 2 has a substantially rectangular shape and an area slightly smaller than that of the fracture-opening section 1. A hinge portion 3 is formed at one end (upper end) of the reinforcement plate member 2 with respect to the transverse direction (shorter-side direction). The hinge portion 3 extends in the longitudinal direction (longer-side direction) of the reinforcement plate member 2 and is bent outward (in the direction of an arrow) as the airbag inflates. The hinge portion 3 has an intermediate portion 4 bent substantially perpendicular in a direction away from the back surface of the reinforcement plate member 2, and a connection portion 5 extending upward substantially perpendicular from the end edge of the intermediate portion 4.

A base portion 6a of a support member 6 is fixed to the connection portion 5 by means of nuts and bolts 7. The support member 6 has two support arms 6b, which extend in a direction away from the back surface of the reinforcement plate member 2. As shown in FIG. 2, the distal ends of the support arms 6b are fixed to an interior cover 9 by means of tapping screws 8, whereby the reinforcement plate member 2 is supported by the interior cover 9.

A case support member 10 is fixed to the base portion 6a of the support member 6 by means of the nuts and bolts 7. An airbag case 11 for accommodating an unillustrated airbag is fixed to the case support member 10 by means of nuts and bolts 12.

A plurality of depressions 2A are formed, for reinforcement purpose, on the reinforcement plate member 2 in such a manner as to extend in the transverse direction of the reinforcement plate member 2 and to be arranged at predetermined intervals in the longitudinal direction of the reinforcement plate member 2. Blocks of coupling holes 2B are formed in the reinforcement plate member 2 while being arranged at predetermined intervals in the transverse and longitudinal directions of the reinforcement plate member 2 over the entire surface thereof. Each block includes a plurality of coupling holes 2B extending in the transverse direction of the reinforcement plate member 2 and arranged close to one another in the transverse and longitudinal directions of the reinforcement plate member 2.

For each group of coupling holes 2B, a plurality of elongated protrusions 1A are formed on the inner wall surface of the fracture-opening section 1 of the interior cover 9 in a manner as to be aligned with the coupling holes 2B. The elongated protrusions 1A are engaged with the corresponding coupling holes 2B, and the tip ends of the protrusions 1A projecting from the back surface of the reinforcement plate member 2 are melted through application of heat, such that the tip ends are flattened. Thus, the reinforcement plate member 2 is fixedly attached to the inner wall surface of the fracture-opening section 1.

In the above-described configuration, when the unillustrated air bag inflates, the inflating airbag presses, from inside, the reinforcement plate member 2. As a result, the fracture-opening section 1 of the interior cover 9 is fractured along the fracture line and detached from the interior cover 9. Simultaneously, the hinge portion 3 of the reinforcement plate member 2 having been in the state shown in FIG. 2 is bent as shown in FIG. 3, and the case support member 10 having been in the state shown in FIG. 2 is bent as shown in FIG. 3. As a result, the detached fracture-opening section 1 having been in the state shown in FIG. 2 is opened outward as shown in FIG. 3, resulting in formation of an opening 9A in the interior cover 9. The unillustrated airbag inflates further and projects outward from the interior cover 9 through the opening 9A. Thus, the intended purpose is achieved.

Figure 3:
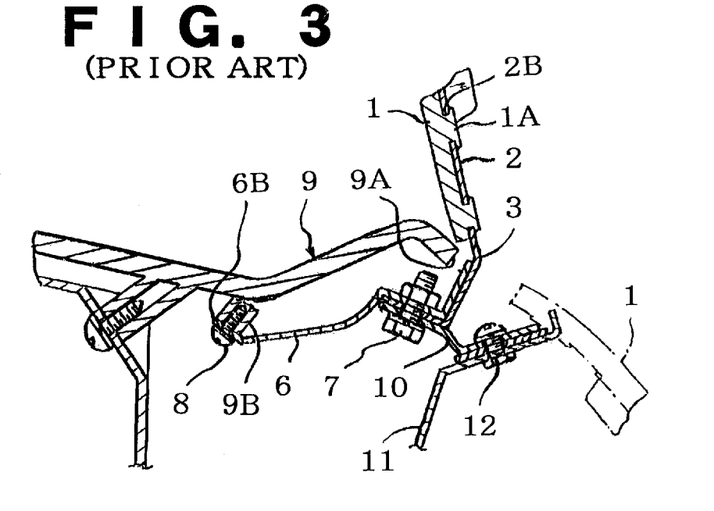
FIG. 3 is an explanatory sectional view of the main portion after inflation of the airbag.

However, in the conventional automobile airbag apparatus, when the fracture-opening section 1 of the interior cover 9 fractures from the fracture groove upon inflation of the airbag, the hinge portion 3 of the reinforcement plate member 2 and the case support member 10 are bent as shown in FIG. 3. Therefore, reaction forces generated when the hinge portion 3 and the case support member 10 are bent concentrate on a support-member fixing portion 9B of the interior cover 9 supporting the tapping screws 8, with the result that the support-member fixing portion 9B breaks and separates from the interior cover 9. As a result, the opening action of the fracture-opening section 1 including the reinforcement plate member 2 becomes unstable, which may hinder the inflation of the airbag through the opening 9A.

The fracture-opening section 1 and the reinforcement plate member 2 are united through a process of fitting the elongated protrusions 1A of the fracture-opening section 1 into the coupling holes 2B of the reinforcement plate member 2, and melting the tip ends of the protrusions 1A projecting from the back surface of the reinforcement plate member 2 through application of heat, such that the tip ends are flattened. Since the reinforcement plate member 2 formed of a single metal plate and the interior cover 9 formed of a synthetic resin such as polypropylene differ in coefficient of linear expansion, the following problems arise. The interior temperature of a vehicle is as high as 110° C. in summer, and as low as −35° C. in a cold region in winter. As a result, the reinforcement plate member 2 attached to the back surface of the fracture-opening section 1 of the interior cover 9 expands and contracts, resulting in generation of warpage or deformation. In this case, the reinforcement plate member 2 may separate from the back surface of the fracture-opening section 1 due to breakage of the joining portions therebetween, thereby hindering the fracture of the fracture-opening section 1 along the fracture groove and hindering the smooth opening of the reinforcement plate member 2 about the hinge portion 3. Further, cracks are formed at the edge portion of the opening 9A formed as a result of fracture of the fracture-opening section 1, and in the worst case, the fracture-opening section scatters.

SUMMARY OF THE INVENTION

The present invention has been accomplished in order to solve the above-mentioned problems, and an object of the present invention is to provide an improved structure for a reinforcement plate member used in an automobile airbag apparatus, which structure eliminates adverse effects, such as generation of warpage, on the joint portion between a fracture-opening section of an interior cover and a reinforcement plate member, which would otherwise be caused when the reinforcement plate member is formed of a metal having a coefficient of expansion different from that of the fracture-opening section. The structure of the present invention enables smooth fracture and opening of the fracture-opening section, prevents formation of a clearance between the fracture-opening section and the reinforcement plate member, and prevents scattering of the fracture-opening section which would otherwise result from breakage of the joint portion between the fracture-opening section of the reinforcement plate member.

The present invention provides an automobile airbag apparatus disposed within an instrument panel, steering wheel, or side pillar covered with an interior cover, comprising an airbag case having an opening portion located in opposition to a back surface of the interior cover; an airbag accommodated within the airbag case in a folded state, the airbag being able to be inflated by means of gas from an inflater; a fracture-opening section defined in the interior cover to be located in opposition to the opening portion of the airbag case, the fracture-opening section being defined by at least a fragile groove formed from the back surface of the interior cover to surround the fracture-opening section; and a reinforcement plate member attached to a back surface of the fracture-opening section through deformation of a portion of the fracture-opening section through application of heat thereto, the reinforcement plate member having a shape corresponding to that of the fracture-opening section. In the airbag apparatus, the reinforcement plate member has a main-body portion attached to the back surface of the fracture-opening section and an attachment portion extending from the main-body portion via a hinge portion; and a deformation absorbing structure is formed at least in the main-body portion of the reinforcement plate member.

In the structure according to the present invention, even when the reinforcement plate member is formed of a metal having a coefficient of expansion different from that of the fracture-opening section, the joint portion between the fracture-opening section and the reinforcement plate member does not suffer adverse effects, such as generation of warpage, which would be otherwise caused by variation in temperature. Accordingly, fracture and opening of the fracture-opening section can be effected smoothly, and no clearance is formed between the fracture-opening section and the reinforcement plate member. Further, it becomes possible to prevent scattering of the fracture-opening section, which would otherwise result from breakage of the joint portion.

Moreover, since deformation of the reinforcement plate member is suppressed, the reinforcement structure for suppressing deformation can be omitted, so that the part can be produced at reduced cost.

In another airbag apparatus according to the present invention, a reinforcement rib projects from the back surface of the interior cover, the reinforcement rib having engagement holes located at predetermined intervals in the longitudinal direction and a breakable portion in the vicinity of a connection corner portion through which the reinforcement rib is connected to the interior cover; the reinforcement plate member has an attachment portion extending from a main-body portion via a hinge portion and having attachment holes formed in the attachment portion at positions corresponding to those of the engagement holes; hooks fixed to the airbag case are engaged with the attachment holes and the engagement holes; and a deformation absorbing structure is formed in at least in the main-body portion of the reinforcement plate member.

In still another airbag apparatus according to the present invention, the fracture-opening section is defined by a fragile contour portion surrounding the fracture-opening section and a fragile splitting portion for dividing the fracture-opening section into first and second subsections; first and second reinforcement plate members are attached to back surfaces of the first and second subsections, each of the first and second reinforcement plate members having a main-body portion and an attachment portion extending from the main-body portion via a hinge portion; a reinforcement rib projects from the back surface of the interior cover, the reinforcement rib having engagement holes at predetermined intervals in the longitudinal direction; at least one of the first and second reinforcement plate members has attachment holes formed in the attachment portion at positions corresponding to those of the engagement holes; hooks fixed to the airbag case are engaged with the attachment holes and the engagement holes; and a deformation absorbing structure is formed in at least in the main-body portion of each of the first and second reinforcement plate members.

BRIEF DESCRIPTION OF THE DRAWINGS

FIGS. 6a to 6c are views showing one modification of the reinforcement plate members, wherein

DESCRIPTION OF THE PREFERRED EMBODIMENT

An embodiment of the present invention will next be described in detail with reference to the drawings.

In the present specification, the terms "front" and "rear" correspond to the front and rear, respectively, of a vehicle, and the terms "right" and "left" correspond to the right-hand and left-hand sides, respectively, of the vehicle.

Figure 4:
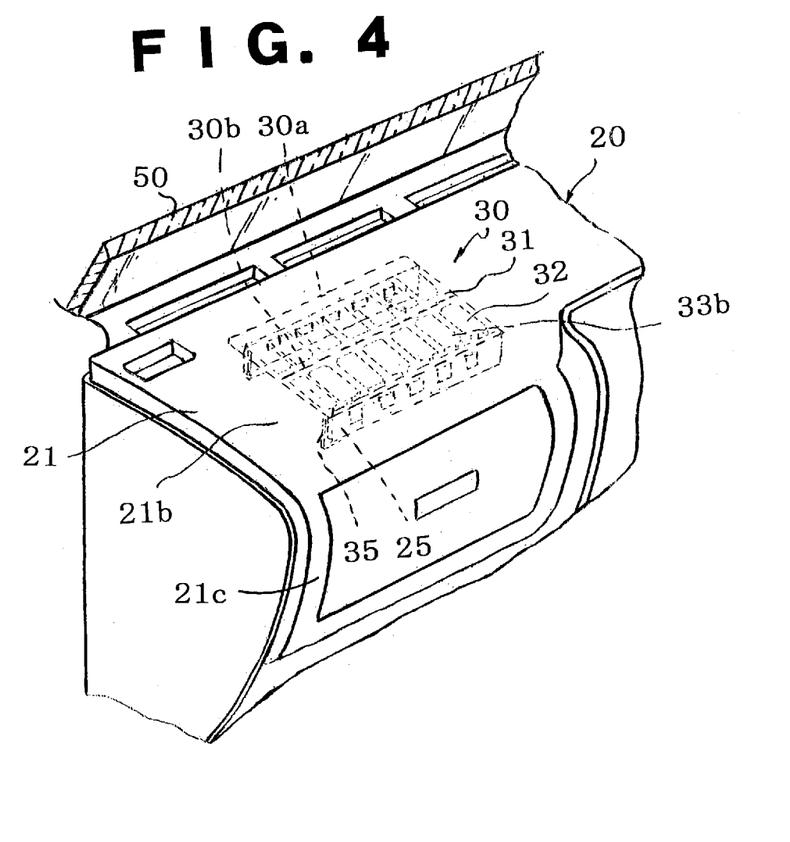
FIG. 4 is a perspective view of an airbag apparatus for a front passenger seat which employs reinforcement plate members having a structure according to an embodiment of the present invention.
Figure 5:
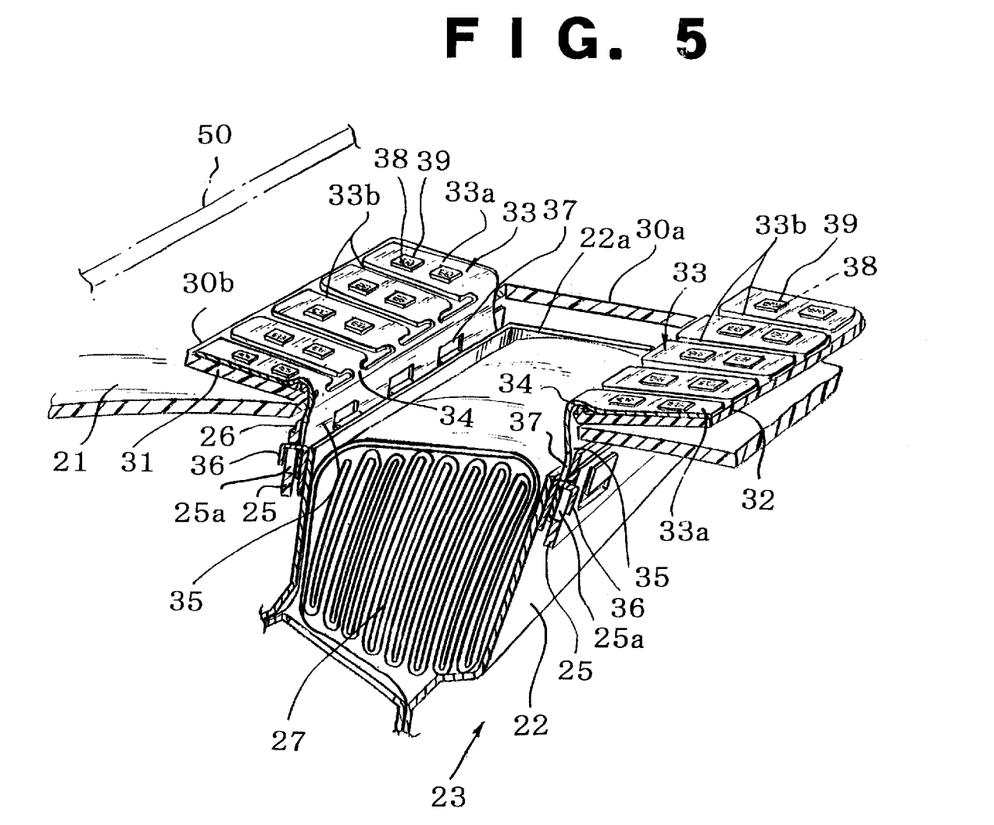
FIG. 5 is a perspective view of the reinforcement plate members in the state in which the fracture-opening section of the airbag apparatus is opened.

As shown in FIGS. 4 and 5, reference numeral 21 denotes an instrument panel cover (hereinafter referred to as an "interior cover"), which covers an instrument panel core 20. The instrument panel core 20 and the interior cover 21 are each molded from a synthetic resin, such as polypropylene. The interior cover 21 is fixedly attached, by appropriate means, such as tapping screws, to the instrument panel core 20, which, in turn, is fixedly attached to a frame (not shown) of a vehicle.

As shown in FIGS. 4 and 5, an accommodation section 23 for accommodating a metallic airbag case 22 is defined by means of a partition member (not shown) located behind the interior cover 21 and in opposition to a front seat passenger seat. The present embodiment is applied to a vehicle with right-hand drive. A vehicle with left-hand drive employs a mirror image of the configuration of the present embodiment.

The partition member is removably attached to the frame of the vehicle via a plurality of tapping screws in order to facilitate the attachment of the airbag case 22 and other elements to the interior cover 21.

A fracture-opening section 30, which is split open upon inflation of an airbag 27, is formed on the interior cover 21 in opposition to the accommodation section 23. The fracture-opening section 30 assumes a substantially rectangular shape and an area substantially equal to that of an opening portion 22a of the airbag case 22. Through laser processing, which will be described later, a fragile groove serving as a contour portion 30a is formed to surround the fracture-opening section 30, and a fragile groove serving as a splitting portion 30b is formed at the center in the front/rear direction so as to extend along the longitudinal direction or right/left direction. The fracture-opening section 30 can be split into two pieces along the splitting portion 30b.

Two reinforcement ribs 25 project from the lower surface of the interior cover 21 such that the reinforcement ribs 25 face each other and extend along the longitudinal direction of the fracture-opening section 30. The reinforcement ribs 25 each have a plurality of engagement holes 25a. A thin portion 26 serving as a breakable portion is formed on each reinforcement rib 25 in the vicinity of the corner portion where the reinforcement rib 25 is connected to the interior cover 21. An airbag 27 is accommodated in a folded condition within the airbag case 22. The airbag 27 is connected to an unillustrated inflater (gas generator) disposed outside the partition member, by means of a gas feed pipe. A plurality of hooks 36 are welded to each of the front and rear surfaces of the airbag case 22.

The fracture-opening section 30 is formed to assume a size corresponding to that of the opening portion 22a of the airbag case 22 disposed below the interior cover 21. The fracture-opening section 30 has a splitting portion 30b, which extends in the right/left direction at a substantially central portion, while dividing the fracture-opening section 30 into a front subsection 31 and a rear subsection 32.

The splitting portion 30b is biased toward the front passenger seat such that, between the two subsections 31 and 32 of the fracture-opening section 30, the subsection 32 located on the side of the front passenger seat of the vehicle is slightly smaller in area than the other subsection 31 located on the side of the windshield 50 of the vehicle.

The contour portion 30a and the splitting portion 30b of the fracture-opening section 30, each formed of a fracture groove, include fragile portions formed by means of a laser (not shown). Specifically, a pulsating laser beam is applied from behind the interior cover 21 while being moved relatively along the contour portion 30a and the splitting portion 30b to thereby form the fragile portions.

Horizontal main-body portions 33a of two reinforcement plate members 33 are fixedly attached to the back surfaces of the subsections 31 and 32 of the fracture-opening section 30 through melt-joining. The reinforcement plate members 33 each have an attachment portion 35, which extends downward from a hinge portion 34 continuous with the horizontal main-body portion 33a. Elongated holes 37 are formed in the attachment portion 35 at longitudinal positions corresponding to those of the engagement holes 25a of the reinforcement ribs 25. The hooks 36 fixed to the front and rear surfaces of the airbag case 22 are engaged with both the elongated holes 37 of the attachment portions 35 and the engagement holes 25a of the reinforcement ribs 25. Moreover, a plurality of slits 33b serving as a deformation absorbing structure, which is the feature of the present invention, are formed in the horizontal main-body portions 33a of the two reinforcement plate members 33 in such a manner that the slits 33b are disposed at predetermined intervals in the longitudinal direction of the reinforcement plate members (right/left direction) and extend in parallel in the transverse direction (front/rear direction).

The slits 33b may be formed at predetermined intervals in the transverse direction of the reinforcement plate member 33 such that the slits 33b are alternately formed from the longitudinal opposite ends of the reinforcement plate member 33 in the longitudinal direction.

The horizontal main-body portions 33a of the reinforcement plate members 33 have substantially rectangular outer shapes corresponding to those of the front and rear subsections 31 and 32 of the fracture-opening section 30. Excepting portions where the slits 33b are formed, blocks of coupling holes 38 are formed on each of the reinforcement plate members 33 such that the blocks are arranged at predetermined intervals in the transverse and longitudinal directions of the reinforcement plate member 33 over the entire surface thereof. Each block includes a plurality of coupling holes 38 extending in the transverse direction of the reinforcement plate member 33 and arranged close to one another in the transverse and longitudinal directions of the reinforcement plate member 33.

A plurality of elongated protrusions 39 are formed on the inner wall surfaces of the subsections 31 and 32 of the fracture-opening section 30 in such a manner as to be aligned with the coupling holes 38 formed in the reinforcement plate members 33. The elongated protrusions 39 are engaged with the corresponding coupling holes 38, and the tip ends of the protrusions 39 are melted through application of heat, such that the tip ends are flattened. Thus, the reinforcement plate members 33 are fixedly attached to the corresponding front and rear subsections 31 and 32.

Next will be described a method for forming the fracture-opening section 30 on the interior cover 21 located in opposition to the accommodation section 23.

The contour portion 30a and the splitting portion 30b of the fracture-opening section 30, which is split open upon inflation of the airbag 27, are formed on the interior cover 21 by means of a laser. Specifically, a pulsating laser beam (output: 3 kW to 5 kW) of a predetermined frequency (e.g., 7 kHz) emitted from a laser is applied to the interior cover 21 from behind while being moved relatively at a predetermined speed along the outline edge of the reinforcement plate member 33 fixedly attached to the back surface of the interior cover 21. Thus, groove-like fragile portions are formed on the interior cover 21 according to the relative speed of movement of and the pulsation pattern of a laser beam emitted from the laser.

As mentioned above, fragile grooves are formed on the interior cover 21 in a certain pattern along the entire outline edge of the reinforcement plate member 33. The thus-formed fragile portions define the contour portion 30a and the splitting portion 30b, along which the fracture-opening section 30 fractures upon inflation of the airbag 27.

Preferably, the subsection 32 of the fracture-opening section 30, which is located on the side of the front passenger seat of a vehicle, assumes such a size as not to project from the horizontal surface 21b of the interior cover 21 toward the passenger seat upon inflation of the airbag 27.

The thus-configured airbag apparatus for a front passenger seat according to the present embodiment of the present invention functions in the following manner. Upon collision of the vehicle, an impact force caused by the collision is detected by a sensor. A control unit including a CPU judges whether or not the detected impact force is equal to or higher than a predetermined value. When the control unit judges that the impact force is not lower than the predetermined value, the control unit issues a signal for causing the inflater to generate a predetermined gas. The gas is fed to the airbag 27 so as to promptly inflate the airbag 27.

The inflating airbag 27 presses, from inside, the fracture-opening section 30 of the interior cover 21 via the reinforcement plate member 33. As a result, the front and rear subsections 31 and 32 of the fracture-opening section 30 are fractured along the contour portion 30a and the splitting portion 30b and are detached from the interior cover 21. Since the attachment portions 35 of the reinforcement plate members 33 are engaged with the hooks 36 of the airbag case 22 via the elongated holes 37, the reinforcement plate members 33 slide slightly due to presence of the elongated holes 37, whereby the upward pressure acting on the reinforcement plate members 33 is reduced. Further, since the slits 33b are formed in the horizontal main-body portions 33a of the reinforcement plate members 33, deformations due to temperature variations can be absorbed, so that breakage of the connection portions between the reinforcement plate members 33 and the front and rear subsections 31 and 32 of the fracture-opening section 30 can be avoided. Accordingly, impact-absorbing performance is improved, and scattering of the front and rear subsections 31 and 32 can be prevented.

Further, immediately before completion of inflation of the airbag 27, the reinforcement ribs 25 break from the thin portions 26 thereof. Subsequently, the front and rear subsections 31 and 32 of the fracture-opening section 30 are fractured along the contour portion 30a and the splitting portion 30b and are detached from the interior cover 21. The detached front and rear subsections 31 and 32 are opened outward while being turned inside out about the hinge portions 34 of the reinforcement plate members 33.

Simultaneously, the inflating airbag 27 projects outward from the interior cover 21 through the thus-formed opening in the interior cover 21. Serving as a cushion, the inflated airbag 27 supports a front seat passenger at his/her chest and head, thereby protecting the passenger from the impact force of collision.

According to the thus-configured airbag apparatus for a front passenger seat, the fracture-opening section 30 is formed on the back surface of the interior cover 21 such that the fracture-opening section 30 can be fractured along the contour portion 30a and the splitting portion 30b composed of fragile portions, which are formed through laser processing. Further, the slits 33b obviate adverse effect on the joint portion which is otherwise caused by the difference in coefficient of expansion between the fracture-opening section 30 and the reinforcement plate members 33. Therefore, the fracture-opening section 30 can be reliably opened together with the reinforcement plate members 33, without generation of deformation of the fracture-opening section 30. Thus, safety is improved.

In the above-described embodiment, each of the thin portions 26 of the reinforcement ribs 25 is a concave portion formed on the outer surface of each reinforcement rib 25. However, needless to say, in place of the concave portion, a through hole may be formed as a breakable portion.

Further, in the above-described embodiment, an airbag apparatus for a front-passenger seat has been described. However, the present invention can be applied to the airbag apparatus built in the center portion of a steering wheel, a side pillar, or any other suitable location.

Figure 6A:
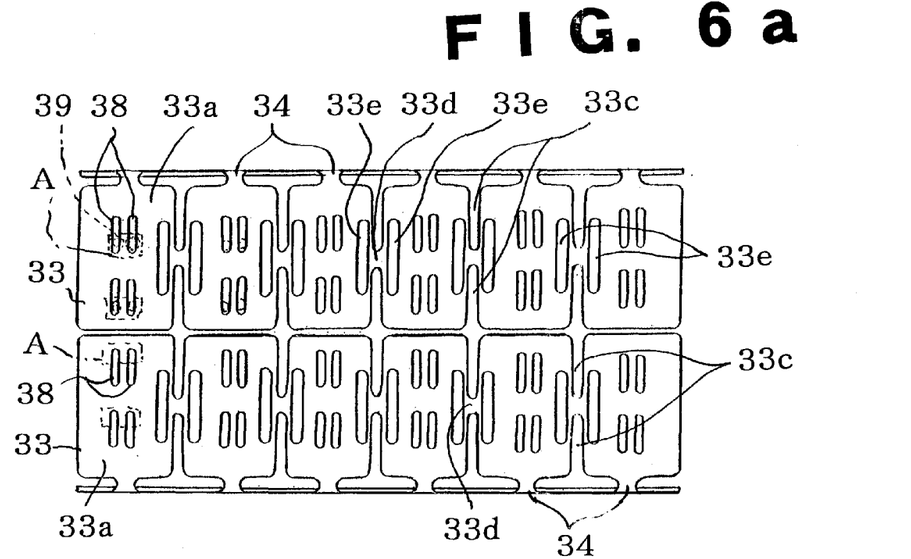
FIG. 6a is a plan view.
Figure 6B:
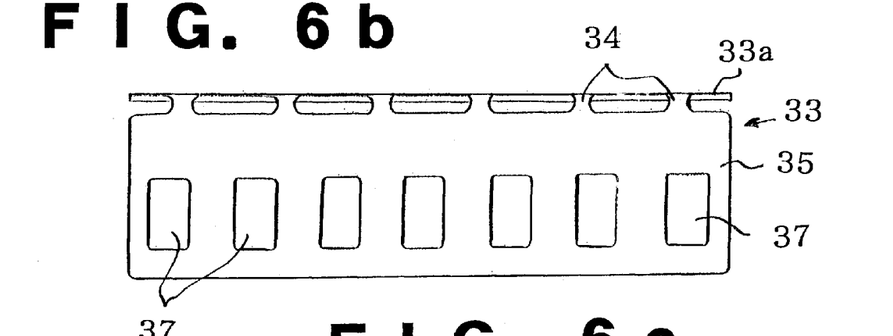
FIG. 6b is a front view.
Figure 6C:
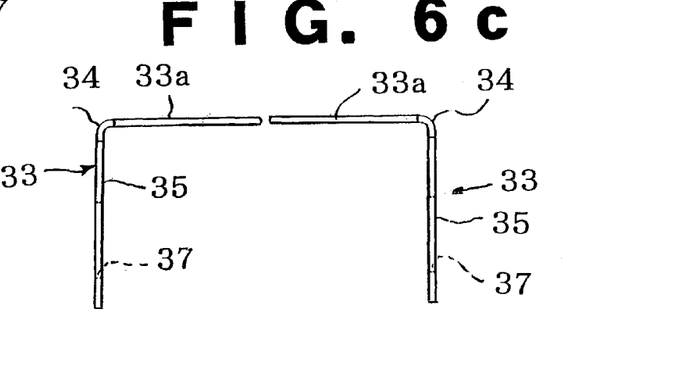
FIG. 6c is a side view.

FIGS. 6a to 6c show one modification of the reinforcement plate members 33 according to the present invention.

In the reinforcement plate members 33 of the present modification, slits 33c serving as a deformation absorbing structure are formed in the horizontal main-body portions 33a of the reinforcement plate members 33 at predetermined intervals along the longitudinal direction of the main-body portions 33a. Specifically, at each longitudinal position, two slits 33c are formed from the transverse opposite ends of each main-body portion 33a in the transverse direction, with a connection portion 33d left therebetween. Further, openings 33e are formed in the main-body portion 33a in the vicinity of and on opposite sides of the connection portion 33d.

Moreover, the main-body portions 33a of the reinforcement plate members 33 have coupling holes 38, which receive the protrusions 39 formed on the back surface of the fracture-opening section. The area of each coupling hole 38 is rendered greater than a welding area A in which the tip end portions of the protrusions 39 are melted and spread through application of heat.

In the reinforcement plate members 33, the slits 33c and 33e formed in the main-body portions 33a absorb deformation (expansion and contraction) of the reinforcement plate members 33 that is due to variation in the interior temperature of the vehicle. Further, since the area of each coupling hole 38 is greater than the welding area A, the protrusions 39 can move within the coupling holes 38 when the reinforcement plate members 33 deforms; i.e., expands or contracts. Thus, breakage of the joint portions can be prevented.

Figure 7:
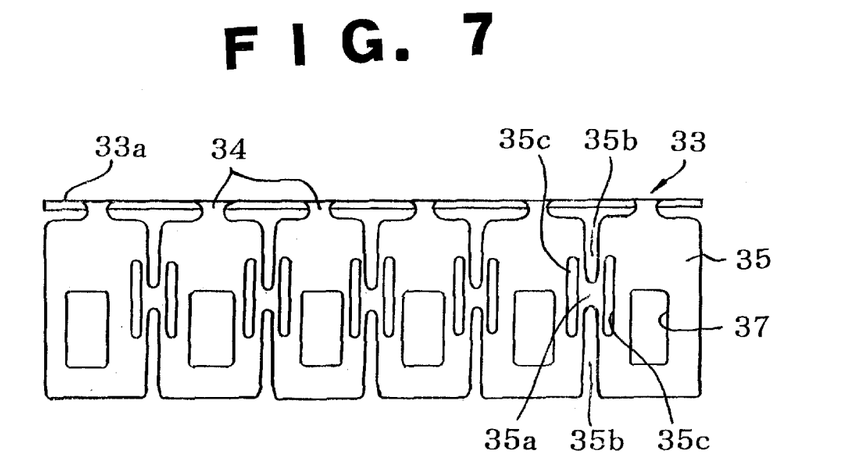
FIG. 7 is a front view showing another modification of the reinforcement plate members.

FIG. 7 shows another modification of the reinforcement plate members 33 according to the present invention.

In the reinforcement plate members 33 according to the present modification, slits 35b are formed in the attachment portions 35 of the reinforcement plate members 33 at predetermined intervals along the longitudinal direction of the attachment portions 35. Specifically, at each longitudinal position, two slits 35b are formed from the opposite ends of each attachment portion 35 in the transverse direction, with a connection portion 35a left therebetween. Further, openings 35c are formed in the attachment portion 35 in the vicinity of and on opposite sides of the connection portion 35a. In FIG. 7, reference numeral 37 denotes each of engagement holes with which the hooks 36 of the airbag case 22 are engaged.

Since the structures of other portions are the same as those of the above-described embodiment, these portions are denoted by the same reference numerals, and their repeated descriptions are omitted.

In the present modification, since a deformation absorbing structure such as slits are formed in the attachment portions of the reinforcement plate members as well, the deformation absorbing action for absorbing expansion and contraction of the reinforcement plate members can be improved.

The airbag apparatus described in the above-described embodiment has a fracture-opening section which is divided at the center into two subsections. However, the present invention is not limited thereto. For example, effects similar to those obtained in the above-described embodiment can be obtained even in the case in which the present invention is applied to an airbag having an undividable fracture-opening section and a single reinforcement plate member.

What is claimed is:

1. An automobile airbag apparatus disposed within an instrument panel, steering wheel, or side pillar covered with an interior cover, comprising:

an airbag case having an opening portion located in opposition to a back surface of said interior cover;

an airbag accommodated within said airbag case in a folded state, said airbag being able to be inflated by means of gas from an inflater;

a fracture-opening section defined in said interior cover to be located in opposition to the opening portion of said airbag case, said fracture-opening section being defined by at least a fragile groove formed from the back surface of said interior cover to surround said fracture-opening section;

a reinforcement plate member attached to a back surface of said fracture-opening section through deformation of a portion of said fracture-opening section through application of heat thereto, said reinforcement plate member having a shape corresponding to that of said fracture-opening section, wherein said reinforcement plate member has a main-body portion attached to the back surface of said fracture-opening section and an attachment portion extending from said main-body portion via a hinge portion; and a deformation absorbing structure is formed at least in the main-body portion of said reinforcement plate member wherein said deformation absorbing structure includes a plurality of slits devoid of material and formed at predetermined intervals in the longitudinal direction of said reinforcement plate member such that the slits extend in parallel in the transverse direction of said reinforcement plate member.

2. An automobile airbag apparatus disposed within an instrument panel, steering wheel, or side pillar covered with an interior cover, comprising:

an airbag case having an opening portion located in opposition to a back surface of said interior cover;

an airbag accommodated within said airbag case in a folded state, said airbag being able to be inflated by means of gas from an inflater;

a fracture-opening section defined in said interior cover to be located in opposition to the opening portion of said airbag case, said fracture-opening section being defined by at least a fragile groove formed from the back surface of said interior cover to surround said fracture-opening section;

a reinforcement plate member attached to a back surface of said fracture-opening section through deformation of a portion of said fracture-opening section through application of heat thereto, said reinforcement plate member having a shape corresponding to that of said fracture-opening section, wherein said reinforcement plate member has a main-body portion attached to the back surface of said fracture-opening section and an attachment portion extending from said main-body portion via a hinge portion; and a deformation absorbing structure is formed at least in the main-body portion of said reinforcement plate member wherein said deformation absorbing structure includes a plurality of slits devoid of material and formed in the main-body portion at predetermined intervals in the longitudinal direction of the main-body portion such that at each longitudinal position two slits extend from transverse opposite ends of the main-body portion in the transverse direction with a connection portion left therebetween.

3. An automobile airbag apparatus according to claim 2, wherein an opening is formed in the main-body portion in the vicinity of the connection portion.

4. An automobile airbag apparatus according to claim 2, wherein said deformation absorbing structure further includes a plurality of slits formed in the attachment portion at predetermined intervals in the longitudinal direction of the attachment portion such that at each longitudinal position two slits extend from transverse opposite ends of the attachment portion in the transverse direction with a connection portion left therebetween.

5. An automobile airbag apparatus according to claim 4, wherein an opening is formed in the attachment portion in the vicinity of the connection portion.

6. An automobile airbag apparatus disposed within an instrument panel, steering wheel, or side pillar covered with an interior cover, comprising:

an airbag case having an opening portion located in opposition to a back surface of said interior cover;

an airbag accommodated within said airbag case in a folded state, said airbag being able to be inflated by means of gas from an inflater;

a fracture-opening section defined in said interior cover to be located in opposition to the opening portion of said airbag case, said fracture-opening section being defined by at least a fragile groove formed from the back surface of said interior cover to surround said fracture-opening section; and a reinforcement plate member attached to a back surface of said fracture-opening section through deformation of a portion of said fracture-opening section through application of heat thereto, said reinforcement plate member having a shape corresponding to that of said fracture-opening section, wherein a reinforcement rib projects from the back surface of said interior cover, said reinforcement rib having engagement holes located at predetermined intervals in the longitudinal direction and a breakable portion in the vicinity of a connection corner portion through which said reinforcement rib is connected to said interior cover;

said reinforcement plate member has an attachment portion extending from a main-body portion via a hinge portion and having attachment holes formed in the attachment portion at positions corresponding to those of the engagement holes;

hooks fixed to said airbag case are engaged with the attachment holes and the engagement holes; and a deformation absorbing structure is formed in at least in-the main-body portion of said reinforcement plate member.

7. An automobile airbag apparatus according to claim 6, wherein said deformation absorbing structure includes a plurality of slits formed at predetermined intervals in the longitudinal direction of said reinforcement plate member such that the slits extend in parallel in the transverse direction of said reinforcement plate member.

8. An automobile airbag apparatus according to claim 6, wherein said deformation absorbing structure includes a plurality of slits formed in the main-body portion at predetermined intervals in the longitudinal direction of the main-body portion such that at each longitudinal position two slits extend from transverse opposite ends of the main-body portion in the transverse direction with a connection portion left therebetween.

9. An automobile airbag apparatus according to claim 8, wherein an opening is formed in the main-body portion in the vicinity of the connection portion.

10. An automobile airbag apparatus according to claim 8, wherein said deformation absorbing structure further includes a plurality of slits formed in the attachment portion at predetermined intervals in the longitudinal direction of the attachment portion such that at each longitudinal position two slits extend from transverse opposite ends of the attachment portion in the transverse direction with a connection portion left therebetween.

11. An automobile airbag apparatus according to claim 10, wherein an opening is formed in the attachment portion in the vicinity of the connection portion.

12. An automobile airbag apparatus disposed within an instrument panel, steering wheel, or side pillar covered with an interior cover, comprising:

an airbag case having an opening portion located in opposition to a back surface of said interior cover;

an airbag accommodated within said airbag case in a folded state, said airbag being able to be inflated by means of gas from an inflater;

a fracture-opening section defined in said interior cover to be located in opposition to the opening portion of said airbag case, said fracture-opening section being defined by at least a fragile groove formed from the back surface of said interior cover to surround said fracture-opening section; and a reinforcement plate member attached to a back surface of said fracture-opening section through deformation of a portion of said fracture-opening section through application of heat thereto, said reinforcement plate member having a shape corresponding to that of said fracture-opening section, wherein said fracture-opening section is defined by a fragile contour portion surrounding said fracture-opening section and a fragile splitting portion for dividing said fracture-opening section into first and second subsections;

first and second reinforcement plate members are attached to back surfaces of said first and second subsections, each of said first and second reinforcement plate members having a main-body portion and an attachment portion extending from the main-body portion via a hinge portion;

a reinforcement rib projects from the back surface of said interior cover, said reinforcement rib having engagement holes at predetermined intervals in the longitudinal direction;

at least one of said first and second reinforcement plate members has attachment holes formed in the attachment portion at positions corresponding to those of the engagement holes;

hooks fixed to said airbag case are engaged with the attachment holes and the engagement holes; and a deformation absorbing structure is formed in at least in the main-body portion of each of said first and second reinforcement plate members.

13. An automobile airbag apparatus according to claim 12, wherein said deformation absorbing structure includes a plurality of slits formed at predetermined intervals in the longitudinal direction of said reinforcement plate member such that the slits extend in parallel in the transverse direction of said reinforcement plate member.

14. An automobile airbag apparatus according to claim 12, wherein said deformation absorbing structure includes a plurality of slits formed in the main-body portion at predetermined intervals in the longitudinal direction of the main-body portion such that at each longitudinal position two slits extend from transverse opposite ends of the main-body portion in the transverse direction with a connection portion left therebetween.

15. An automobile airbag apparatus according to claim 14, wherein an opening is formed in the main-body portion in the vicinity of the connection portion.

16. An automobile airbag apparatus according to claim 14, wherein said deformation absorbing structure further includes a plurality of slits formed in the attachment portion at predetermined intervals in the longitudinal direction of the attachment portion such that at each longitudinal position two slits extend from transverse opposite ends of the attachment portion in the transverse direction with a connection portion left therebetween.

17. An automobile airbag apparatus according to claim 16, wherein an opening is formed in the attachment portion in the vicinity of the connection portion.

* * * * *